2 Sheets—Sheet 1.
A. G. CHRISTMAN.
Plow.
No. 223,666. Patented Jan. 20, 1880.
Fig 1
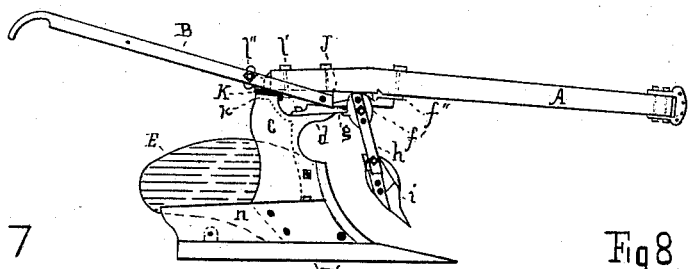
Fig 7
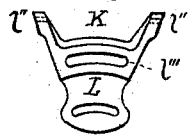
Fig 8
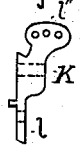
Fig 5
Fig 3
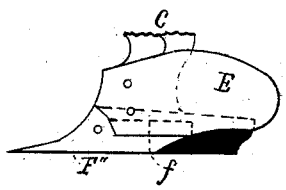
Fig 4
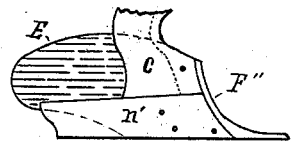
Fig 6
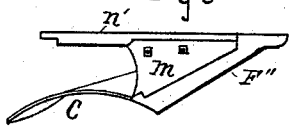
Fig 2
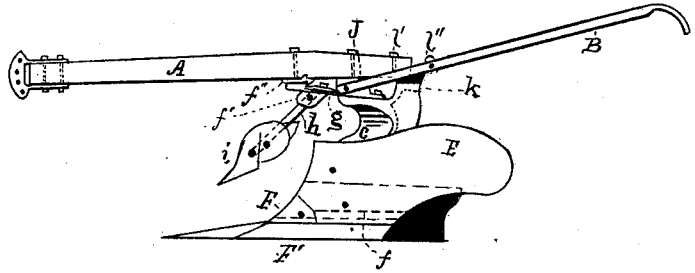
Witnesses
Frank P Kinsey
Frank Hartman
Inventor
Augustus G Christman
Per Thomas P Kinsey
Atty 2 Sheets—Sheet 2.

A. G. CHRISTMAN.
Plow.

No. 223,666.   Patented Jan. 20, 1880.

Witnesses
Frank P. Kinsey
Frank Hartman

Inventor
Augustus G. Christman
Per Thomas P. Kinsey
Atty

UNITED STATES PATENT OFFICE.

AUGUSTUS G. CHRISTMAN, OF SHERIDAN, PENNSYLVANIA.

PLOW.

SPECIFICATION forming part of Letters Patent No. 223,666, dated January 20, 1880.

Application filed October 28, 1879.

*To all whom it may concern:*

Be it known that I, AUGUSTUS G. CHRISTMAN, of Sheridan, Lebanon county, State of Pennsylvania, have invented certain Improvements in the Construction of Plows, of which the following is a specification.

The object of my invention has been to construct a plow suitable for all kinds of soil and adapted to its variable conditions during the different seasons of the year.

The want of a plow easily kept in order, which at the will of the farmer could be shod with either a cast or wrought iron point or share, has long been acknowledged.

I do not broadly claim such a plow as new, but do claim to have invented such an arrangement of cast-iron plow as can be easily shod with wrought-iron, if desired.

Figure 1 is a land-side view of my plow, in which A is the beam; B, the handles; C, the standard; $d$, the standard arm or pad; E, the mold-board; F, a wrought-iron bar share or point; $g$, a malleable-iron brace; $f'$, the colter-bar block; $i$, the jointer; J, the fulcrum-block and pin for the beam, resting upon the pad $d$ of the standard C. K is the lock-block for the handles and beam, having a projection, L, with a circumferential slot, which receives the bolt $l'$ for securing the beam in position. This block has also palms $l''$, for the adjustment of the handles vertically. The horizontal movement of the handles B is secured through an oblong circumferential slot in the block K. $k$ is the seat for the lock-block.

In Fig. 6 is a reverse view of the plow, shod with cast-iron, in which M is a special shoe, which, in combination with the cast-iron point, permits a change to be made to a wrought-iron share, Fig. 5 showing the reverse of a plow with a wrought-iron share in place.

Fig. 2 is a side elevation on the mold-board side of the plow, for the purpose of showing a filler-piece, F, used in connection with the wrought-iron point.

Figs. 3 and 4 are partial elevations of the cast-iron plow as claimed.

Fig. 7 is a plan, and Fig. 8 a side elevation, of the lock-block K, in which L is the locking-seat with slot for the beam; $l'''$, the locking-slot for the handles horizontally, and $l''$ the palms for adjusting the handles vertically.

Figure 9:
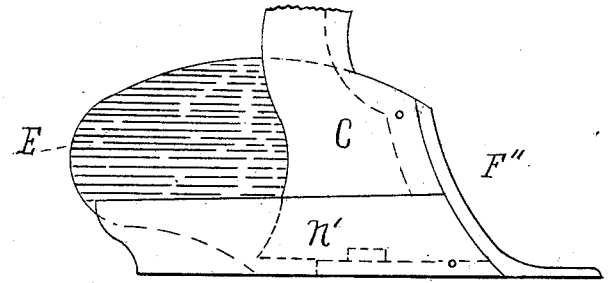
Figure 11:
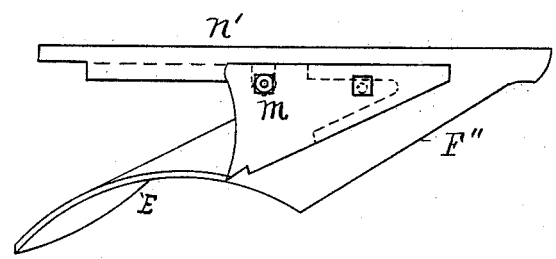
Figure 10:
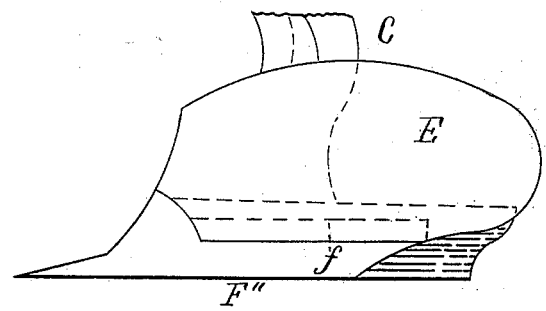

Sheet 2, Figs. 9, 10, and 11 are partial elevations and a reverse plan of the cast-iron plow on a larger scale, so as to indicate more clearly the parts claimed.

Similar letters of reference refer in all the drawings to similar parts.

The standard C is composed of two sides, converging at an acute angle in the front of the plow, and provided, as usual, with seats for the mold-board, land-side, and share. Above the mold-board the standard is closed across the top to form a seat for the lock-block K, and having a projecting arm, $d$, upon which is secured the brace $g$ and fulcrum-block J. The base of the standard is not closed until after the attachment of the mold-board and land-side, when it is closed with the loose shoe-piece M, retained in place by a vertical bolt through the standard and a bolt through an ear on the land-side. The piece M prevents the compression of the plow horizontally, and, when it with the share F'' is removed, leaves a flat surface on both mold-board and land-side for a bed for a plain wrought-iron share.

The brace $g$ is for the purpose of shifting or adjusting the beam with relation to the center of the plow without disturbing the alignment of the colter or jointer $i$, secured to the pad $f'$ on the same. The fulcrum-block J is so arranged as to admit of a vibratory movement of the handles B upon a horizontal pin through the same and of a horizontal movement of the beam on the fulcrum-pin J.

The locking-block K has two slots concentric with each other, both drawn from the fulcrum-pin J. The slot L permits the movement of the tail of the beam A, and tightening the bolt in the slot secures it in position. The slot $l'''$, in conjunction with the slot L, allows for the adjustment of the handles in a horizontal position, while the palms $l''$, with a series of holes or an oblong slot in the same, secure the handles at a suitable height.

Underneath the beam A, at the bolt, I place a strengthening and wearing pad, $f''$, which is notched to both the beam A and brace $g$, and thus transfers the strain from the bolt to the brace and beam.

The joint $f$ between the mold-board and the share is made with acute edges as to each other, but so adjusted that when the cast-iron share is removed the joint of the mold-board and the lower end of the standard C shall be on the same level to permit the use of a flat plate wrought-iron bar-share.

I claim—

1. The combination of a cast-iron share or point, F'', of form shown and described, with an open-base hollow standard, C, mold-board E, land-side N', and loose shoe-piece M, for the purpose substantially as described.

2. The hollow standard C, with open base, in combination with the mold-board E, having its lower front end cut away at e, and adapted to receive the cast-iron share F'', land-side N', and independent shoe-piece M, or the wrought-iron bar-share F', segment F, and land-side N, substantially as shown and described.

3. The adjusting-brace g, with transverse slot, in combination with standard C, colter block or pad f', and beam A, as shown and described.

4. The standard C, with arm d and seat k, in combination with the adjusting-brace g, fulcrum-block J, lock-block K, and beam A, substantially as shown and described.

5. The colter pad or block f', in combination with the adjusting-brace g, colter h i, and standard C, substantially as shown, and for the purpose described.

6. The adjustable handles B, in combination with the fulcrum-block J, lock-block K, and palms l'', for the purpose substantially as shown and described.

AUGUSTUS G. CHRISTMAN.

Witnesses:
 FRANK O. KINSEY,
 H. A. ZIEBER.